United States Patent [19]

Abbott

[11] 4,318,039
[45] Mar. 2, 1982

[54] SWITCHING POWER SUPPLY REGULATOR UTILIZING LINEAR REGULATOR DEVICE

[75] Inventor: Warwick R. Abbott, Woburn, Mass.

[73] Assignee: The Nixdorf Computer Corporation, Burlington, Mass.

[21] Appl. No.: 110,869

[22] Filed: Jan. 10, 1980

[51] Int. Cl.³ .............................................. G05F 1/44
[52] U.S. Cl. .................................................... 323/273
[58] Field of Search .................... 323/17, 23, 22 J, 25, 323/273, 274, 275, 303

[56] References Cited

U.S. PATENT DOCUMENTS 4,068,158  1/1978  Hicks et al. ............................ 323/17

FOREIGN PATENT DOCUMENTS 278784  12/1970  U.S.S.R. ........................ 323/DIG. 1

Primary Examiner—William M. Shoop
Attorney, Agent, or Firm—Krass, Young & Schivley

[57] ABSTRACT

A voltage regulator network (10) for use in cooperation with a linear regulator device (18) to supply at least one regulated output voltage (20). A transformer (T1) includes first (N1) and second (N2) windings. A capacitor (C2) is coupled to the output of line (20) of the network (10) in parallel with the load (21) to be supplied with the regulated voltage (V2). The regulator device (18) is switched on and off in a cyclical manner to minimize its power dissipation yet reap the advantages inherent with such devices. In its on state, capacitor (C2) is supplied with sufficient charging current from the regulator device (18). When the device (18) is turned off, charging current is supplied from the second winding (N2). Provision is made for generating different regulated voltage levels (V3) by the inclusion of a third winding (N3).

12 Claims, 3 Drawing Figures

SWITCHING POWER SUPPLY REGULATOR UTILIZING LINEAR REGULATOR DEVICE

DESCRIPTION

1. Technical Field

This invention relates generally to power supplies and more particularly, to power supplies having a regulated output.

2. Background Art

In the electronics field there are many applications which require the generation of precise voltage levels. In one such application, precise voltage levels are required for biasing semiconductor components. Many computer systems include a backup battery operated power supply for providing power to nonvolatile memory components to maintain the storage of pertinent data therein despite primary power failure. Unfortunately, the battery voltage level is generally not at the same level required for proper biasing of these memory components. Conventional batteries often are susceptible to fluctuations in their output power levels. Such fluctuations would cause degradation of the component operation even if the battery voltage level was ideally the same as the appropriate biasing voltage level.

Heretofore, these problems were solved by the use of a linear regulator integrated circuit device which provides an interface between the battery and the system components. The linear regulator device accepts the power level from the battery and conditions it to provide output signals to the system components at precise levels corresponding to the associated component biasing level. A variety of manufacturers distribute these linear regulator devices. For example, both Fairchild and Texas Instruments manufacture uA7800 Series linear regulator devices. These devices generally include advantageous features to protect the output voltages from short circuits by internal current limiter and thermal overload protection circuitry. In addition to being readily available from a variety of sources, these devices are relatively inexpensive. Unfortunately, they dissipate a substantial amount of power. This is because they are continuously being energized from the battery supply voltage, with the continuous energization being necessary to maintain the regulated output voltage. Consequently, the battery life is shortened.

As an alternative to linear regulator devices, the industry has developed what is known as switching regulators which do not suffer from the same power dissipation problem as the linear regulators. However, these switching regulators are relatively expensive since they operate on a different theory of operation. Moreover, their implementation does not readily lend itself to the economic provision of the current limiter feature inherent with the linear regulator devices and it is not practically feasible to include thermal protection at all in these switching regulators.

In many systems applications, it is necessary to provide different regulated biasing voltages to various components in the system. Prior art regulator networks provide multiple regulated outputs by exotic and expensive circuit modifications or, alternatively, use separate regulator networks for each different biasing voltage.

The present invention is directed to overcoming one or more of the problems as set forth above.

DISCLOSURE OF THE INVENTION

In one aspect of the present invention, a voltage regulator network is provided which capitilizes on the advantageous features of the linear regulator devices while minimizing its power dissipation. The network includes a transformer having at least first and second windings in which the first winding is coupled between the supply voltage, generally a battery, and an input to the linear regulator device. A capacitor is coupled to the output of the linear regulator device, as is the output of the second winding. This common point of connection provides the regulated output voltage to the load. When the capacitor charges to the regulated voltage level, the linear regulator device is turned off. When the linear regulator is turned off, the battery power generated in the first winding induces a second current to be generated in the second winding to maintain the charge on the capacitor and keep the network output at the regulated voltage level. When the induced energy in the second winding can no longer supply sufficient current to the first capacitor to maintain it at the regulated level, the linear regulator is again turned on. This switching cycle is successively repeated so that the network is precisely regulated, yet the power dissipation of the linear regulator device is kept to a minimum.

Another feature of this invention includes a first diode having a given forward voltage drop. The cathode of the first diode is coupled to the input of the second winding and the anode of the first diode is coupled to ground. A feedback network is coupled between the input of the second winding and a common input to the linear regulator device. The feedback network provides signals of opposite polarity when the linear regulator device is turned on and off thereby facilitating quick energization and deenergization of the linear regulator device minimizing transient power dissipation.

Still another aspect of this invention includes the ability to provide multiple different regulated output voltage levels. This can be accomplished simply by adding another winding to the transformer magnetically coupled to the second winding. In the preferred embodiment, a regulated voltage level at the same potential level but of opposite polarity is provided by a third winding wound so as to have an opposite polarity but the same number of turns as the second winding. A second diode having its cathode coupled to the output of the third winding is chosen so that its forward voltage drop cancels the effect of voltage levels created by the first diode.

BRIEF DESCRIPTION OF THE DRAWINGS

These and other advantages of the present invention will become apparent upon reading the following specification and by reference to the drawings in which.

BEST MODE FOR CARRYING OUT THE INVENTION

Figure 1:
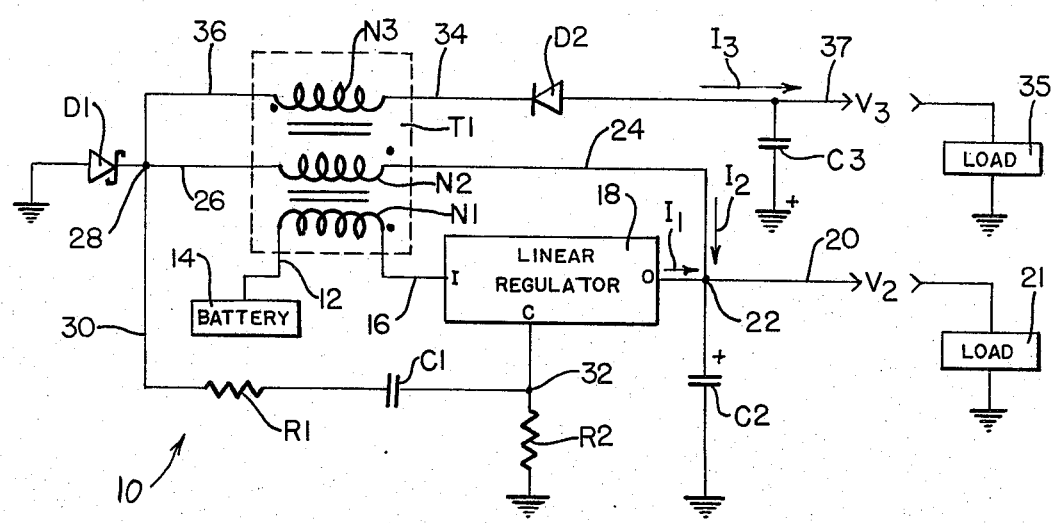
FIG. 1 is a schematic diagram of the preferred embodiment of the present invention.

Referring to FIG. 1, the regulator network 10, includes a transformer T1. Transformer T1, in this embodiment, includes a primary winding N1 and two secondary windings N2 and N3. Transformer T1 is of the type that includes a ferrite core within an air gap. The windings N1, N2, and N3 have a turns ratio of 1:1:1, each winding having about 60 turns. Winding N2 is wound so that it has the same polarity as primary winding N1. This is designated by the corresponding dots in the drawing. However, winding N3 is wound to provide an opposite polarity from windings N1 and N2. Different types of transformers may be utilized.

The input 12 to winding N1 is coupled to a supply voltage source such as battery 14. In this embodiment, battery 14 provides an unregulated output voltage of about 12 volts. The output 16 of winding N1 is coupled to the input of linear regulator device 18. Linear regulator device 18 includes internal circuitry which effectively compares the voltage differential between its output 0 and a common input C and generates sufficient current I1 to maintain the network output voltage V2 to load 21 at a precise regulated voltage level irregardless of the actual voltage developed by battery 14. An example of a typical linear regulator device 18 is a series uA7800 linear integrated circuit manufactured by Texas Instrument, Inc. The particular embodiment shown in FIG. 1 utilizes a uA7805C component which provides a five volt regulated output on line 20.

For the purposes of this invention a linear voltage regulator is a device which provides an essentially constant voltage at its output and which provides the constant voltage output by operating the active elements in the device within a range of current and voltage levels to keep the active elements in the linear region of their operating characteristics.

Figure 2:
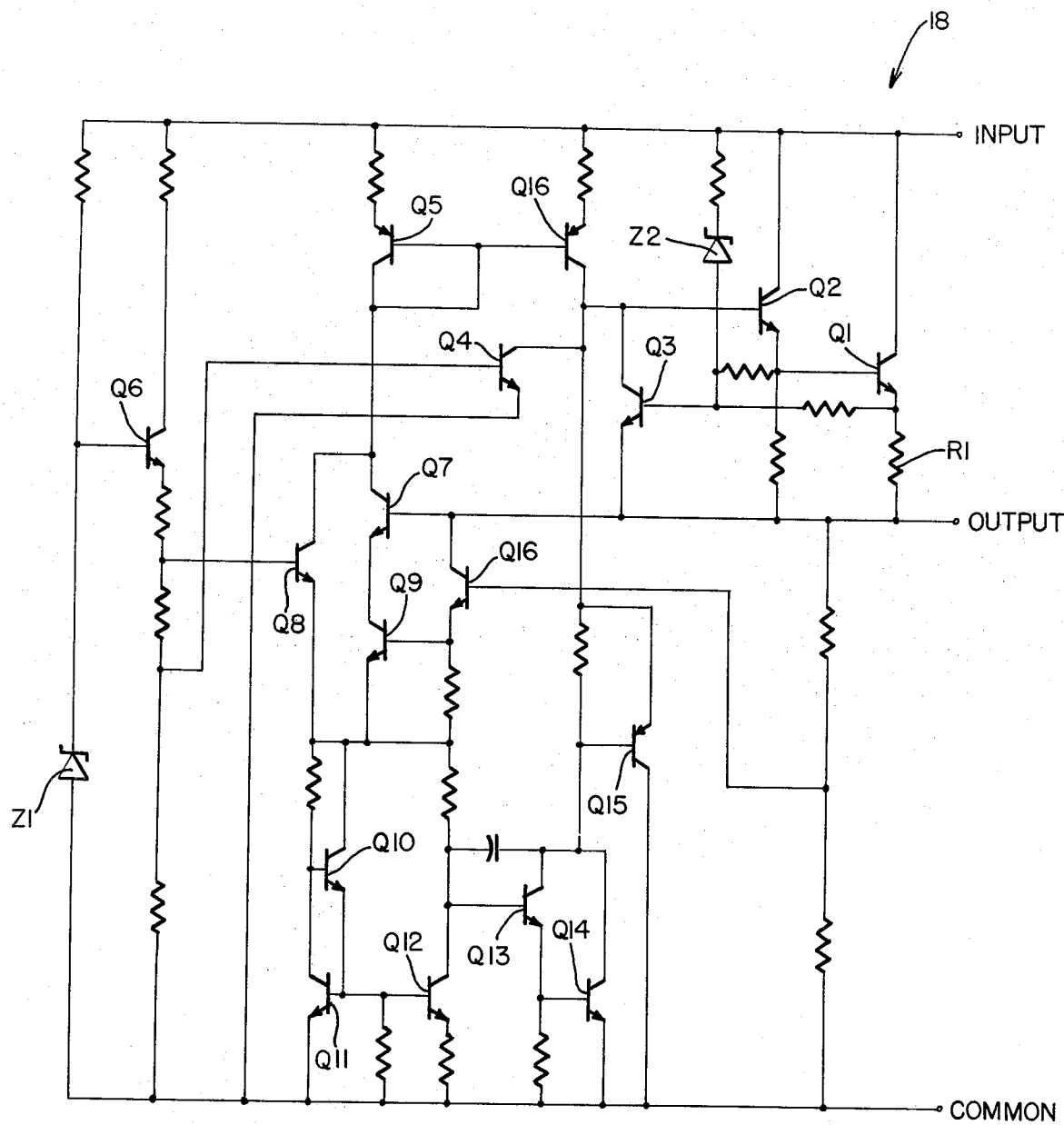
FIG. 2 is a schematic diagram of a known linear regulator device.

FIG. 2 shows a schematic of the Texas Instruments linear voltage regulator I.C. which incorporates an integral reference developed by Zener diode $Z_1$, a feedback amplifier consisting of transistors $Q_8$ through $Q_{15}$ controlling a series pass Darlington transistor pair $Q_1$ and $Q_2$, short circuit current limiter transistor $Q_3$, and thermal overload protection transistors $Q_3$ and $Q_4$.

Short circuit current limiting occurs when the output current flowing through resistor R1 is large enough to turn on transistor $Q_3$ which then shunts the current source (transistor $Q_{16}$) directly to the output thus limiting the base drive to Darlington pair $Q_2$, $Q_1$. Safe area compensation is provided via Zener diode $Z_2$ which increases transistor $Q_3$ forward bias at high input voltages and thus lowers the output current required through resistor R1 to cause limiting to occur.

Thermal protection is achieved in two ways. First, the current limit section has a negative temperature coefficient due to the negative temperature coefficient of the base-emitter junction of transistor $Q_3$ and the positive coefficient of resistor R1. Second, thermal shutdown is achieved by transistor $Q_4$ which has a fixed bias derived from the reference and a negative base-emitter temperature coefficient, such that it turns on at the maximum permissible chip temperature and thereby shunts the output Darlington ($Q_1$ and $Q_2$) base drive to the common terminal.

Output regulation is achieved by comparing the output with the reference via transistors $Q_{16}$, $Q_9$ and $Q_8$. The difference is level changed via transistors $Q_{10}$, $Q_{11}$, then amplified and fed back to the Darlington ($Q_1$ and $Q_2$) base by transistors $Q_{12}$-$Q_{15}$. Changes in the input voltage are isolated from the output by using current source supplied by transistor $Q_{16}$ to bias the Darlington base. Since the current is determined by transistor $Q_5$, current which is in turn fixed by the reference, the base drive to Darlington pair $Q_1$, $Q_2$ is independent of input voltage variations.

Although one particular example has been described, it should be understood that a variety of different linear regulator devices may be utilized and fall within the scope of the present invention.

Returning now back to FIG. 1, the network 10 further includes a capacitor C2 having one end coupled to output line 20 at node 22. The other end of capacitor C2 is connected to ground. In this embodiment, capacitor C2 has a value of 150 μf.

The output 24 of winding N2 is also coupled to node 22. The input 26 of winding N2 is coupled to node 28. A feedback loop 30 including series connected resistor R1 and capacitor C1 is connected between node 28 and node 32. Node 32 is coupled to the common input C of device 18 and to ground through resistor R2.

The cathode of Schottky diode D1 is coupled to node 28, with the anode of diode D1 being coupled to ground. In this embodiment, Schottky diode D1 has a forward voltage drop, i.e. the voltage drop across the PN junction when diode D1 is conducting, of about 0.35 volts. Diode D1 in this embodiment is a component No. IN5817.

The input 36 of the third winding N3 is coupled to node 28. The output 34 of winding N3 provides a second regulated output voltage V3 to load 35 through regular silicon diode D2. The anode of diode D2 is coupled to one plate of capacitor C3, with its other plate being connected to ground. Capacitor C3 has a value of 10 μf in this specific example. The cathode of diode D2 is connected to the output 34 of winding N3. Diode D2 has a forward voltage drop of about 0.7 volts. In this particular example it is a component No. IN4150 device. The particular forward voltage drops of diodes D1 and D2 play an important role in one aspect of this invention as will become apparent later herein. The forward voltage drops of these diodes may be varied somewhat; however, the forward voltage drop of diode D2 should be about twice that of diode D1.

INDUSTRIAL APPLICABILITY

Figure 3:
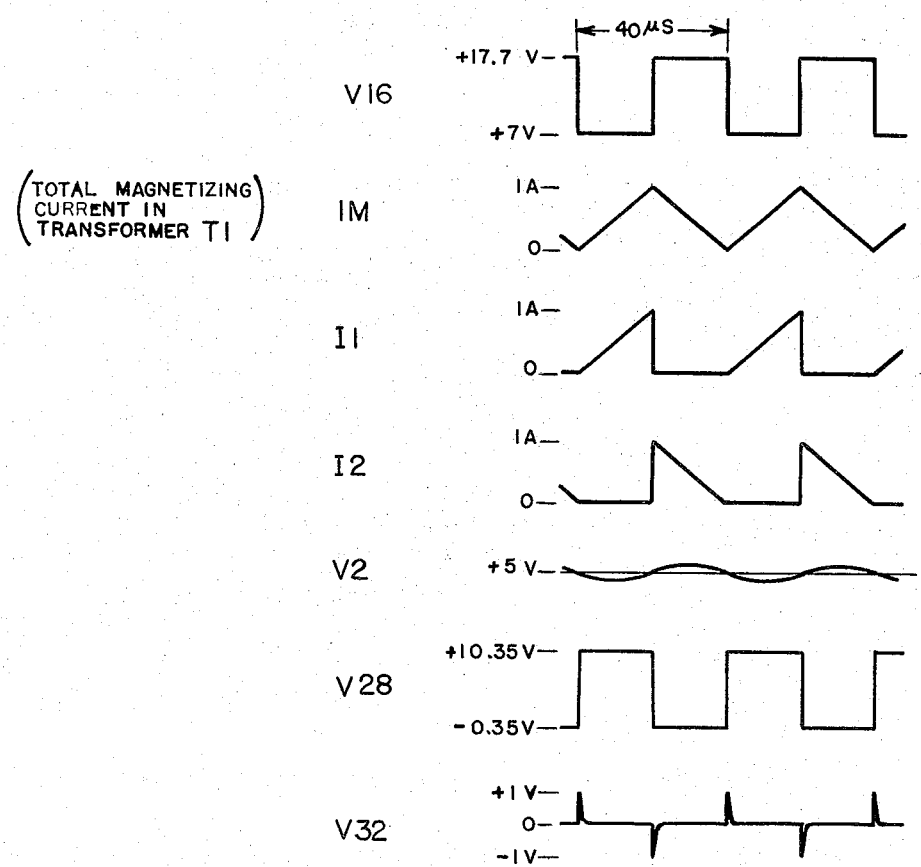
FIG. 3 is a timing chart showing current and voltage levels generated by the circuitry of FIG. 1.

With special emphasis being placed upon the timing chart of FIG. 3, as well as the circuit details of FIG. 1, the operation of the regulator network 10 will now be described.

Network 10 operates in a cyclical fashion such that current over network output line 20 to the load 21 is provided alternately by I1 and I2. Upon initialization, the charge on capacitor C2 is such that node 22 is below the regulated voltage for which device 18 is designed to provide. Thus, device 18 turns on and supplies current via I1 to charge up capacitor C2 until its stored voltage level equals the particular desired regulated voltage which, in this example, is about +5 volts. Since the load 21 is coupled in parallel cross capacitor C2, it too is supplied with this five volt regulated output over line 20. When linear regulator device 18 is on, the input 12 of winding N1 is more positive than its output 16. Thus, a voltage of corresponding polarity is induced in winding N2 with its input 26 being more positive than its output 24. Negative current flow I2 is prevented by the operation of blocking diode D1. However, the positive voltage developed at node 28 is fed back to the common input C of device 18 through feedback loop 30.

The operation of the RC network comprised of R1 and C1 causes a positive pulse to be applied to the common input C of device 18. Since device 18 effectively compares the voltage differential between its output O and its common input C, regulator 18 will turn on very quickly since the device is designed to always provide an output which is five volts above the voltage at its common input. For example, if common input C were merely coupled to ground and its output O was at a similar level, device 18 would only "see" a five volt differential. However, pursuant to this feature of the present invention, the pertinent terminals of device 18 will be presented with a much larger differential. In the particular embodiment shown, the peak of the feedback positive pulse at node 28 is about +10.35 volts. The maximum feedback voltage level at node 32 is determined by the values of resistors R1 and R2 which in this embodiment are 100 and 10 ohms, respectively, which divides the voltage level at node 32 to about +1 volt. Consequently, device 18 will turn on very quickly and saturate in attempting to make up the simulated 6 volt differential. Capacitor C1 has a value of about 0.2 μf such that an RC time constant is developed in conjunction with resistor R1 so that the waveform at node 32 decays to a negligible level in about 20μ seconds.

When linear regulator 18 is on, the output 34 of winding N3 is more positive than the input 36. With this polarity, diode D2 blocks further current I3 from being generated. However, the value of capacitor C3 is such that it will maintain a regulated −5 volt output for V3 during this part of the cycle even though it is not receiving any further charging current which is supplied in the "off" cycle. Therefore, the load 35 is maintained at the −5 volt regulated output.

When capacitor C2 charges to the regulated five volt level via current I1, regulator 18 will turn off. Under such conditions the polarity of the input 12 and output 16 of winding N1 effectively reverses such that the output 16 is now more positive than the input 12. This induces a voltage in winding N2 of a corresponding polarity with output 24 now being more positive than the input 26. Accordingly, a positive current flow I2 is generated which maintains the charge on capacitor C2 to the regulated five volt level. This occurs as long as the stored energy in winding N2 provides sufficient current I2 to maintain the charge on capacitor C2.

When the winding N2 is first placed in this polarity, a negative pulse is initially created in feedback line 30. This provides a negative pulse to the common input of regulator device 18 as can be seen in FIG. 3. Now, the differential between the voltages on output line O and the common input C is substantially greater than the regulated voltage level for which device 18 is designed. In the particular embodiment shown, the voltage to the common input C of regulator 18 falls to a −1 volt level for a predetermined period of time determined again by the RC time constant of R1 and C1. Therefore, the regulator device 18 turns off very quickly since it "believes" that its output line O is six volts above the voltage on the common input C.

When linear regulator device 18 is off, the input 36 to winding N3 is more positive than the winding N3 output 34. This causes a negative current flow for I3 which charges capacitor C3 such that V3 output line 37 is at −5 volts. In this embodiment, the voltage drop across winding N3 is about −5.35 volts. This is the voltage level induced by winding N2 having its output line 24 effectively clamped at the five volt regulated reference level generated at V2 output node 22 and its input clamped at −0.35 volt by the series connected diode D1. However, the voltage ultimately developed across capacitor C3 is only −5 volts. This is due to the fact that the diode D2 is chosen such that its forward voltage drop is twice that of diode D1. Since node 28 is at about −0.35 volts relative to ground, the output 34 of winding N3 is at about −5.7 volts. However, the forward voltage drop of diode D2 is about +0.7 volts which thereby cancels the unbalancing effect of diode D1. It can be shown that the output voltage V3 is derived from the following equation:

$$V3 = -[V2 + 2V_{FDL} - V_{FD2}]$$

where $V_{FDL}$ and $V_{FD2}$ are the forward voltage drops across diodes D1 and D2, respectively. Since, $V_{DF2} = 2V_{FD1}$ then, V3=V2. Accordingly, the turns ratio of transformer T1 may be 1:1:1 in order to derive the regulated output voltage V3 which has the same magnitude but of opposite polarity as regulated output voltage V2. It is well known in the art that such a simple turns ratio consistently decreases manufacturing costs.

From the foregoing description, it can now be realized that the present invention takes advantage of all of the good features of the linear regulator device 18 but minimizes its power dissipation. Linear regulator 18 needs not be consistently energized in order to maintain the designated regulated output voltage level. In this embodiment it is cycled on and off at about a frequency of 25 kilohertz. Accordingly, the power dissipation of device 18 is substantially minimized. The advantageous features of the device 18 remain intact by the network 10 configuration so that it utilizes its current limiting and thermal overload protection features. The network 10 utilizes very few components and most of the components are relatively inexpensive passive devices. Not only does the present invention provide regulation with a minimum of power dissipation, it further provides multiple regulated outputs. In this embodiment, the regulated outputs are of the same magnitudes but of opposite polarity. As is known in the art, such voltage levels are often necessary in computer systems, with the positive regulated voltage supplying biasing to drive TTL logic and the negative regulated voltage providing substrate biasing for the memory devices. Different multiple regulated outputs can be easily provided by adding different windings with different turns ratios and polarities.

Therefore, while this invention has been described in connection with specific examples thereof, no limitation is intended thereby except as defined in the appended claims.

I claim:

1. A voltage regulator network (10) for use in cooperation with a linear voltage regulator circuit (18) having an input line (I), an output line (O), and a common line (C) connected thereto, said linear regulator circuit (18) being operative to generate a regulated voltage level between said output line (O) and said common line (C) while providing internal current limiting and thermal overload protection circuitry, said network comprising:

a potential source (14);

a transformer (T1) having at least first (N1) and second (N2) windings of corresponding polarities magnetically coupled together, the first winding (N1) having an input (12) coupled to the potential source (14) and an output (16) coupled to the input (I) of the linear regulator circuit (18);

an output line (20) for the network (10) coupled to the output line (O) of the linear regulator circuit (18);

first capacitor means (C2) coupled in parallel between the network output line (20) and a load (21) to be regulated;

said second winding (N2) having an output (24) coupled to the output line (20) of the network;

whereby said linear regulator circuit (18) is switched on and off in a cyclical manner depending upon the voltage level of said first capacitor (C2), with said regulator circuit (18) and second transformer winding (N2) alternately providing current to said capacitor (C2) to maintain the network output line (20) at a predetermined regulated voltage level, said network thereby incorporating the current limiting and overload protection circuitry of the linear regulator circuit while minimizing the power dissipation thereof.

2. The network of claim 1 which further comprises:
a first diode (D1) having a given forward voltage drop, the cathode of the first diode (D1) being coupled to an input (26) of the second winding (N2) and the anode of the first diode (D1) being coupled to ground;

a feedback loop (30) coupled between the input (26) of the second winding (N2) and the common line (C) of the linear regulator circuit (18), operative to provide conditioning signals of first and second polarities whenever linear regulator circuit (18) is initially turned on or off, respectively;

said first diode (D1) blocking negative current flow from being generated by the second winding (N2) when the linear regulator circuit (18) is turned on.

3. The network of claim 2 wherein said feedback loop (30) includes a series connected resistor (R1) and capacitor (C1) defining an RC time constant for said conditioning signals.

4. The network of claim 1 wherein said transformer (T1) further comprises a third winding (N3) magnetically coupled to the second winding (N2) and having an opposite polarity therefrom, said third winding (N3) having an input (36) coupled to the cathode of the first diode (D1), and an output (34) coupled to a second network output line (37), operative to provide a second regulated voltage level thereon of opposite polarity than the first network output line (20).

5. The network of claim 4 which further comprises:
a second diode (D2) having a forward voltage drop substantially twice that of the first diode (D1), said second diode having an anode coupled to the second network output line (37) and a cathode coupled to the output (34) of the third winding (N3), said second diode (D2) operative to cancel voltages which would otherwise be created on the second network output line (37) by said first diode (D1) thereby providing a regulated output voltage thereon of equal magnitude but of opposite polarity than the first network output line (20).

6. The network of claim 5 wherein said first diode (D1) is a Schottky diode having a forward voltage drop of about 0.35 volts and wherein said second diode (D2) is a regular silicon diode having a forward voltage drop of about 0.7 volts.

7. The network of claim 6 wherein said transformer (T1) has a turns ratio of 1:1:1 for said first (N1), second (N2) and third (N3) windings.

8. The network of claim 7 which further comprises:
a second capacitor (C3) coupled to said second network output line (36) in parallel with the load (35) to be supplied thereby.

9. A voltage regulator network (10) for providing a plurality of different regulated output voltages of equal magnitude but of opposite polarity, said network comprising:
a battery (14);
a transformer (T1) having first (N1), a second (N2) and third (N3) windings with substantially the same number of turns, said first (N1) and second (N2) windings having corresponding polarities and the third (N3) winding being of opposite polarity;
the input (12) of the first winding (N1) being coupled to the battery (14) and the output (16) of the first winding (N1) being connected to regulator means (18) for providing a first regulated output (O) of a given magnitude and polarity; the inputs (26, 36) of said second (N2) and third (N3) winding being connected to a cathode of a first diode (D1) having a given forward voltage drop, the output (24) of the third winding (N3) being coupled to the cathode of a second diode (D2) having a forward voltage drop substantially twice that of the first diode (D1); and
an output line (37) coupled to the anode of said second diode (D2) and a first capacitor (C3) coupled in parallel with a first load (35) for providing a regulated output voltage thereto of equal magnitude but of opposite polarity than the output (O) of said regulator means.

10. The network of claim 9 which further comprises a second capacitor (C2) coupled to the output of said regulator means (18) in parallel with a second load (21) to be supplied thereby, and wherein the output (24) of said second winding (N2) is coupled to said capacitor (C2) so that said regulator means (18) is switched on and off, with said capacitor (C2) being alternately charged by current from said regulator means (18) and said second winding (N2) to maintain the first regulated output voltage level while minimizing power dissipation in the regulator means (18).

11. The network of claim 10 wherein said regulator means (18) comprises a linear regulator device (18) having an input (I), an output (O), and a common input (C), said regulator device (18) operative to provide a predetermined regulated voltage differential between said output (O) and said common input (C); and
wherein said network (10) further comprises feedback means (30) including a series connected resistor (R1) and capacitor (C1) coupled between the input (26) of said second winding (N2) and said common input (C) of the regulator device (18) whereby to provide conditioning signals of opposing polarities when said regulator device (18) is initially switched on and off, respectively.

12. A voltage regulator network (10) comprising:
a linear voltage regulator circuit (18) having an input line (I), and an output line (O), and a common line (C) connected thereto, said linear regulator circuit (18) being operative to generate a regulated voltage level between said output line (O) and said common line (C) while providing internal current limiting and thermal overload protection circuitry;
a potential source (14);
a transformer (T1) having first (N1), second (N2) and third (N3) windings with substantially the same number of turns, said first (N1) and second (N2) windings having corresponding polarities and the third winding (N3) being of opposite polarity;

the input (12) of the first winding (N1) being coupled to the potential source (14) and the output (16) of the first winding (N1) being connected to input line (I) of the linear regulator circuit (18);

an output line (20) for the network (10) coupled to the output line (O) of the linear regulator circuit (18);

first capacitor means (C2) coupled in parallel between the network output line (20) and a first load (21) to be regulated;

said second winding (N2) having an output (24) coupled to the output line (20) of the network;

a first diode (D1) having given forward voltage drop;

the cathode of said first diode (D1), an input (26) of said second winding (N2), and an input (36) of said third winding (N3) being connected to a common node (28);

a feedback loop (30) including a series connected resistor (R1) and capacitor (C1), said feedback loop (30) being connected between common node (28) and to the common input (C) of said linear regulator circuit (18);

a second diode (D2) having its cathode coupled to an output (34) of said third winding (N3) and its anode coupled to a second output line (37) for the voltage regulator network, said second diode (D2) having the forward voltage drop substantially twice that of the first diode (D1); and a second capacitor (C3) coupled to said second network output line (37) in parallel with a second load (35);

whereby said linear regulator circuit is switched on and off in a cyclical manner depending upon the voltage level of said first capacitor (C2), with said regulator circuit (18) and said second transformer winding (N2) alternately providing current to said capacitor (C2) to maintain the first network output line (20) at a predetermined regulated voltage level, the feedback loop (30) being operative to provide conditioning signals of appropriate polarities to aid in the quick energization/deenergization of the linear regulator circuit (18), said second network output line (37) providing a second regulated output voltage at the same magnitude but of opposite polarity of the first regulated output voltage; and wherein the internal current limiting and thermal overload protection circuitry of the linear regulator circuit are used to advantage while minimizing the power dissipation thereof.

* * * * *